UNITED STATES PATENT OFFICE 2,610,208

PROCESS FOR MAKING PENTAENES

Joseph Donald Surmatis, Pompton Plains, N. J., assignor to Hoffmann-La Roche Inc., Nutley, N. J., a corporation of New Jersey No Drawing. Application May 16, 1951,
Serial No. 226,735

2 Claims. (Cl. 260—491)

This invention relates to an improvement in a synthetic process for making vitamin A acetate. In particular, it relates to an improved process having for its overall object the allyl rearrangement-dehydration of 1-acetoxy-3,7-dimethyl-6-hydroxy-9-(2',6',6'-trimethyl-cyclohexene-1'-yl)-nonatriene-2,4,7 (hereinafter referred to as the tetraene reactant) useful as an intermediate in such a synthesis, e. g., the synthesis described in U. S. Patent 2,451,739, issued October 19, 1948. By the process of the invention, the tetraene reactant is converted to vitamin A acetate by treating the former, dissolved in methylene chloride or chloroform, with strong aqueous hydrobromic acid for a short time and at a low temperature, and then without delay subjecting the 1-acetoxy-3,7-dimethyl-8-bromo-9-(2',6',6'-trimethyl-cyclohexene-1'-yl)-nonatriene-2,4,6 formed in the first step to the action of a dilute aqueous solution of sodium bicarbonate or potassium bicarbonate.

In practicing the invention, the only two solvents which have been found suitable are methylene chloride and chloroform; of these, methylene chloride is preferred. The concentration of the aqueous hydrobromic acid which can be used is critical; acid of about 47.9 per cent to about 51.9 per cent strength has been found suitable, but a concentration of about 48.0 per cent is preferred. From about 2.9 to about 3.5 molar proportions of hydrobromic acid can be used for each mol of the tetraene reactant, but it is preferred to use about 3.0 molar proportions. It is preferred to cool both the tetraene reactant and the aqueous hydrobromic acid to about minus 25° C. before the bromination reaction, and to allow the temperature to rise to about minus 15° C. at the end of the bromination reaction; but initially either reactant can be at any temperature, providing that the minus 15° C. upper limit is not overstepped during the bromination reaction. The time during which the bromination is allowed to proceed must be limited to a period between about 5 and about 7 minutes, but a reaction period of about 6 minutes is preferred. At the end of the reaction period, the bromination reaction is stopped by dropping a large volume of water into the reaction mixture and stirring for a period of from about 5 to about 10 minutes, a period of about 7 minutes being preferred. The preferred volume of water added in order to terminate the bromination reaction is about 3.0 l. for each mol of tetraene reactant, but quantities within the range from about 2.7 l. to about 3.3 l. have also been used successfully. Stirring is then discontinued and the mixture is allowed to stratify into an aqueous layer and an organic layer, which stratification requires a further period of about 2 minutes. The elapsed time between the bromination reaction and the dehydrobromination step which follows is thus seen to vary from about 7 to about 12 minutes, the preferred elapsed time being about 9 minutes.

The separated organic layer is then quickly subjected to dehydrobromination by reacting it with an aqueous solution of sodium bicarbonate or potassium bicarbonate, in a concentration of about 5 per cent, sodium bicarbonate being preferred. Slight cooling is desirable, but not mandatory, during this reaction. At least one molar proportion of bicarbonate must be employed, but excess bicarbonate can be used if desired, the amount of excess not being critical; a slight molar excess of about 10 per cent is preferred. The dehydrobromination can be effected by stirring the materials together for about one hour, but in order to insure complete dehydrobromination, it is preferred to conduct the reaction for about three hours. At the end of this time, stirring is discontinued and the mixture is allowed to stratify. The organic layer is separated and washed, and stabilizers are added thereto. The major part of the solvent is removed, and crystalline vitamin A acetate is precipitated from the residue.

It will be appreciated from the foregoing that a preferred embodiment of the invention comprises reacting the tetraene reactant, dissolved in methylene chloride, with about 3.0 molar proportions of aqueous hydrobromic acid having a concentration of about 48.0 per cent for a period of about 6 minutes and at temperatures increasing from about minus 25° C. to about minus 15° C.; stirring with about 3.0 l. of water per mol of tetraene reactant for about 7 minutes; and then quickly separating the organic layer and quickly subjecting it to dehydrobromination by treating it for about 3 hours with a slight molar excess of aqueous sodium bicarbonate in a concentration of about 5 per cent.

As compared with prior art processes for effecting the allyl rearrangement-dehydration conversion in the synthesis of U. S. Patent 2,451,739, the process of the instant invention is advantageous in that the operating conditions are simpler, the yield is greater, and the quality of the vitamin A-containing product is superior, specifically in that the product is crystalline and stable on storage. An additional advantage of the process of the invention resides in the fact that it can be practiced successfully on a large scale as well as in small scale laboratory experiments.

In setting the above limits to define the area of useful operation according to the instant invention, the intention is to point out as accurately as practicable the range of conditions which give acceptable results. For example, it has been found that aqueous hydrobromic acid of 48.0 per cent strength is preferred, but that acid having a concentration as low as 47.9 per cent or as high as 51.9 per cent can be employed to obtain less satisfactory, but still acceptable, results. The lower limit is particularly critical: acid of 47.8 per cent concentration is not acceptable. It will be obvious, however, that the numerical limits stated may be overstepped to a minor or insubstantial degree without departing from the teaching herein, provided that the results obtained are substantially equivalent to those obtained by operation within said stated numerical limits. For example, the use of aqueous hydrobromic acid having a concentration of 47.89 per cent, or a bromination reaction period of 4.9 minutes, or any other minor deviation or combination of deviations from the stated conditions, falls within the teaching of the instant invention, if the net effect of such deviation or deviations does not materially change the outcome of the allyl rearrangement-dehydration conversion.

The invention is further disclosed in the following example, which is illustrative but not limitative thereof.

*Example*

To a mixture of 40 kg. of 1,6-dihydroxy-3,7-dimethyl-9-(2',6',6'-trimethyl-cyclohexene-1'-yl)-nonatriene-2,4,7 and 34 l. of pyridine in 120 l. of methylene chloride were added 15 l. of acetyl chloride dissolved in 40 l. of methylene chloride, while stirring and at such a rate that the internal temperature did not exceed minus 5° C. While cooling, the stirring was continued for an additional hour, and then the reaction mixture was allowed to stand overnight without stirring or external cooling. Thereupon 80 l. of water were stirred into the reaction mixture, and the organic layer which separated was drawn off, and washed with water and dilute sulfuric acid and then again with water.

To the 1-acetoxy-3,7-dimethyl-6-hydroxy-9-(2',6',6'-trimethyl-cyclohexene - 1' - yl) - nonatriene-2,4,7 (obtained as described above), cooled to minus 25° C., were quickly added 50 l. of hydrobromic acid, concentration 48.0 per cent, previously cooled to minus 25° C. The reaction mixture was stirred for 6 minutes, while allowing the temperature to rise to minus 15° C. during this period, and then the reaction was stopped by dropping 400 l. of water into the mixture. After stirring for 7 minutes, the layers were allowed to stratify and the organic layer was quickly separated.

The organic layer was immediately dropped into a well-stirred mixture of 160 l. of water and 80 kg. of crushed ice. A solution of 20 kg. of sodium bicarbonate in 160 l. of water was added to the reaction mixture within a 10 minute period and stirring was continued for 3 more hours. Then the mixture was allowed to stand overnight. The organic layer was separated and washed with water. To the washed batch were added 500 cc. of pyridine and 425 g. of α-tocopherol. About 90 per cent of the solvent was removed from the product by flash evaporation below 50° C., yielding an orange-colored viscous syrup. To this were added 50 l. of substantially anhydrous ethyl alcohol and the mixture was stirred at 0° C. for 12 hours. The resulting slurry was filtered; light yellow crystalline vitamin A acetate, M. P. 59°–60° C., remained on the filter.

I claim:

1. A process of preparing vitamin A acetate which comprises subjecting 1-acetoxy-3,7-dimethyl-6-hydroxy-9-(2',6',6' - trimethyl - cyclohexene-1'-yl)-nonatriene-2,4,7, in solution in a solvent selected from the group consisting of methylene chloride and chloroform, to the action of from about 2.9 to about 3.5 molar proportions of aqueous hydrobromic acid having a concentration between about 47.9 per cent and about 51.9 per cent, for a period of from about 5 to about 7 minutes and at temperatures between about minus 25° C. and about minus 15° C.; stirring with from about 2.7 to about 3.3 liters of water per mol of 1-acetoxy-3,7-dimethyl-6-hydroxy-9-(2',6',6'-trimethyl - cyclohexene - 1' - yl)-nonatriene-2,4,7 for a period of from about 5 to about 10 minutes; and then quickly separating the organic layer and quickly subjecting it to dehydrobromination by treating it for a period of from about 1 to about 3 hours with at least one molar proportion of an aqueous solution of an alkali selected from the group consisting of sodium bicarbonate and potassium bicarbonate in a concentration of about 5 per cent.

2. A process of preparing vitamin A acetate which comprises reacting 1-acetoxy-3,7-dimethyl-6-hydroxy-9-(2',6',6'-trimethyl - cyclohexene-1'-yl)-nonatriene-2,4,7, dissolved in methylene chloride, with about 3.0 molar proportions of aqueous hydrobromic acid having a concentration of about 48.0 per cent, for a period of about 6 minutes and at temperatures increasing from about minus 25° C. to about minus 15° C.; stirring with about 3.0 liters of water per mol of 1-acetoxy-3,7-dimethyl -6 - hydroxy - 9-(2',6',6'-trimethyl-cyclohexene-1'-yl) - nonatriene - 2,4,7 for about 7 minutes; and then quickly separating the organic layer and quickly subjecting it to dehydrobromination by treating it for about 3 hours with a slight molar excess of aqueous sodium bicarbonate in a concentration of about 5 per cent.

JOSEPH DONALD SURMATIS.

No references cited.